United States Patent

[11] 3,589,131

| [72] | Inventor | Frederick G. Grabb |
| | | South Bend, Ind. |
| [21] | Appl. No. | 809,860 |
| [22] | Filed | Mar. 24, 1969 |
| [45] | Patented | June 29, 1971 |
| [73] | Assignee | The Bendix Corp. |
| | | South Bend, Ind. |

[54] VEHICLE BRAKING SYSTEM
10 Claims, 6 Drawing Figs.

[52] U.S. Cl............................................ 60/54.5,
60/54.5 P, 60/54.6 P
[51] Int. Cl............................................ F15b 7/00
[50] Field of Search............................... 60/54.5 P,
54.6 P

[56] References Cited
UNITED STATES PATENTS

| 2,644,305 | 7/1953 | Price et al. | 60/54.5 P |
| 3,162,018 | 12/1964 | Daley, Jr. | 60/54.6 P |
| 3,387,455 | 6/1968 | Eggstein | 60/54.6 P |
| 3,422,622 | 1/1969 | Arentoft et al. | 60/54.5 P |
| 3,470,695 | 10/1969 | Kilb | 60/54.5 P |
| 3,473,329 | 10/1969 | Eggstein | 60/54.6 P |

*Primary Examiner*—Edgar W. Geoghegan
*Assistant Examiner*—A. M. Zupcic
*Attorneys*—Cecil F. Arens and Plante, Arens, Hartz, Hix and Smith ABSTRACT: A pressure ratio changer for selectively responding to a first source of force and a second source of force to pressurize a fluid chamber. A first piston connected to the first source of force is slidably retained in the fluid chamber. A second piston concentrically carried by the first piston has its axial movement limited in one direction by a flange of the first piston. A third piston concentrically carried by the second piston has its axial movement restricted in both directions by a flange on one end and snap ring on the other. The third piston moves in response to an operator activation member to close the fluid communication between the master cylinder piston and the first and second pistons. Now, the reactive force transmitted from the master cylinder piston is proportioned through a reactive chamber to the first and second pistons to bring the system into equilibrium upon activation by an operator.

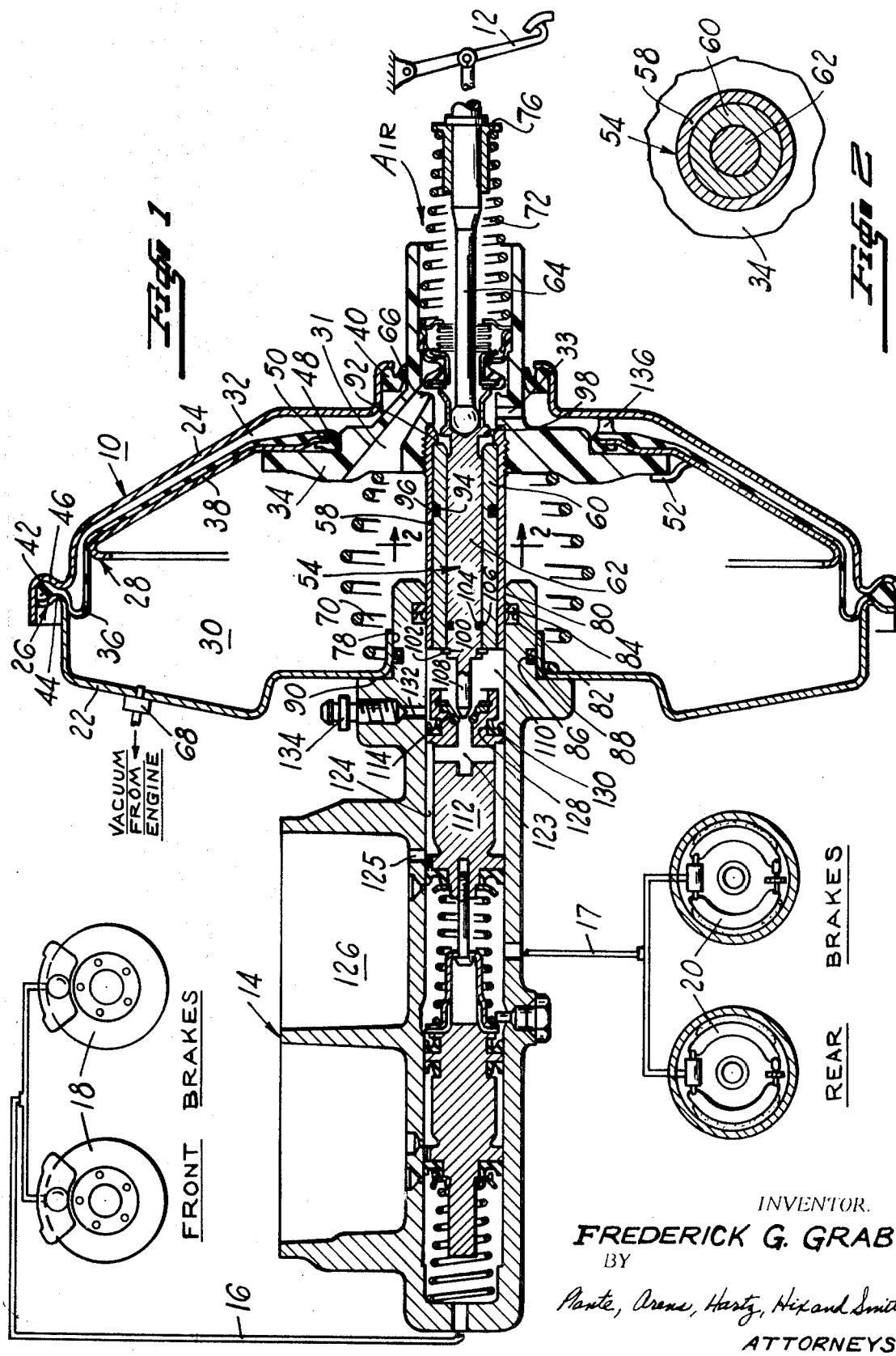

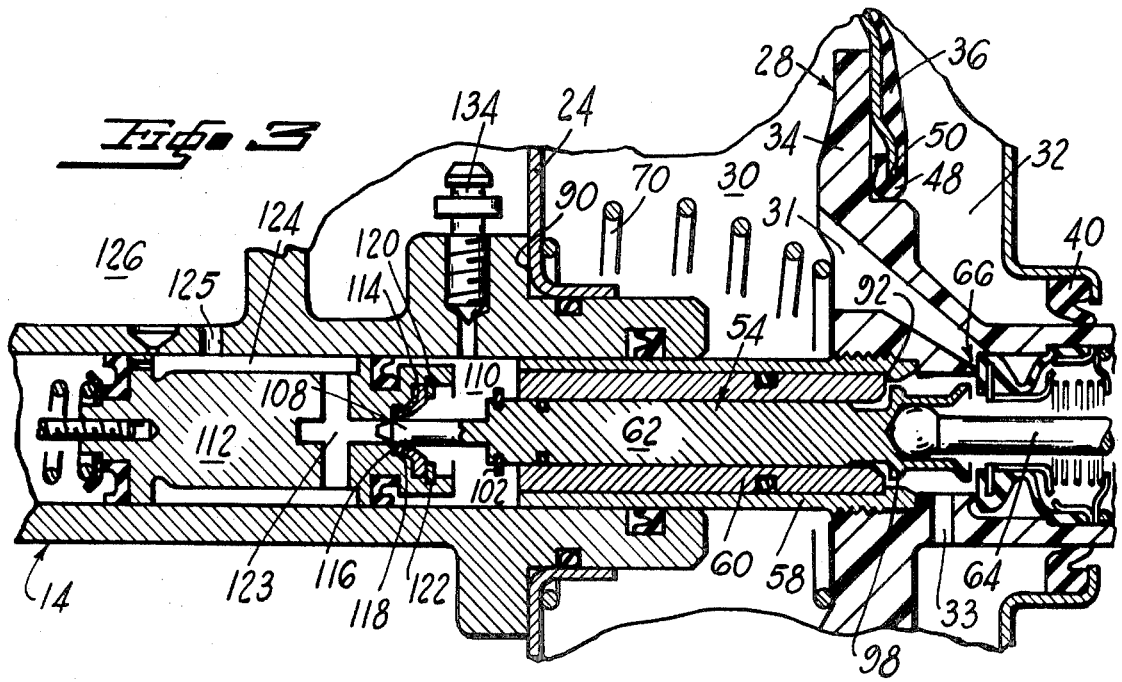
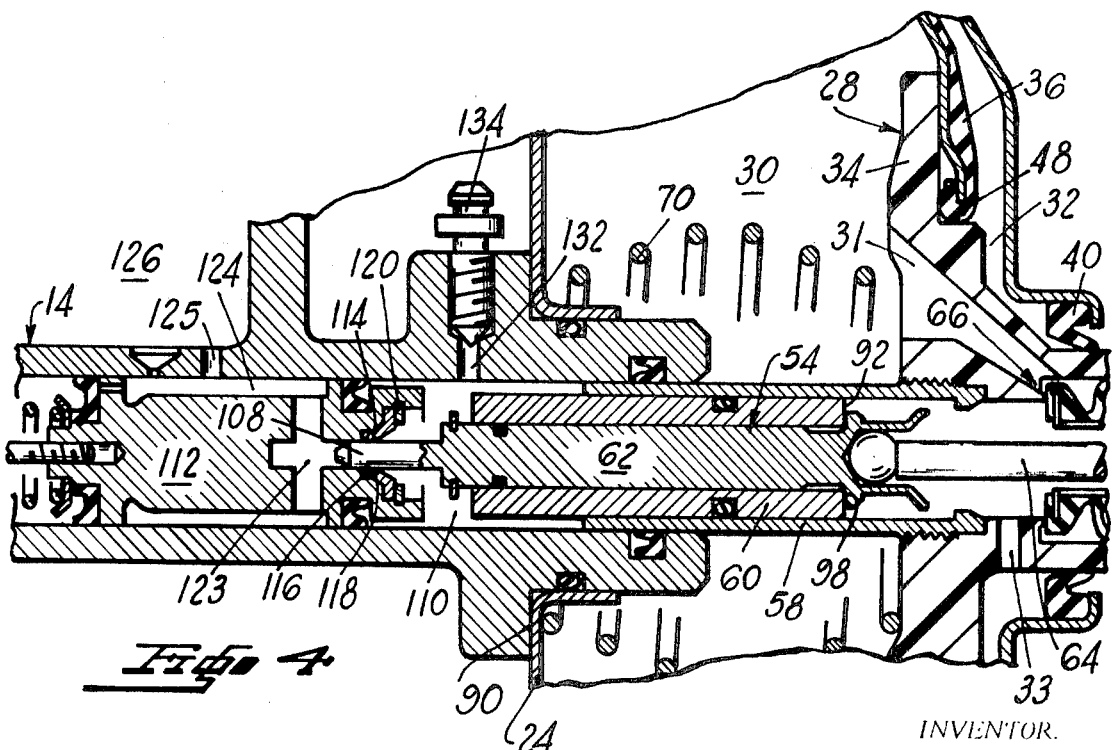

:::: {.columns}
::: {.column}
VEHICLE BRAKING SYSTEM

BACKGROUND OF THE INVENTION

This invention relates to a power-braking system for a motor vehicle. More particularly, it relates to a system that is capable of the required power operation while needing only a relatively short foot pedal travel and low pedal effort. The invention further contemplates a combination power and manual system which minimizes the transition from the power to no-power conditions.

Booster brake systems known in the art have several disadvantages. One is that they usually provide a noticeable change in the foot effort required for operation when power runout (vacuum or air) occurs. Power runout is defined here as the point where the vacuum servo has provided its maximum effect. Additional pressure above this point is provided solely by the manual system. It has been found that considerable foot effort is required to appreciably increase the hydraulic brake line pressure after vacuum runout. Moreover, it has been found that very high braking pressures, which may be required during emergency braking conditions, cannot always be attained with the standard booster system because the extremely high foot effort required is beyond the physical capability of many drivers.

Although this invention is shown in a braking system embodiment, and thus, may well be most valuable in the braking art, it is felt that the invention may be used for any application where a change of pressure ratio of a fluid is required.

SUMMARY OF THE INVENTION

It is an object of this invention to provide an improved power-braking system including manual operation.

It is an object of this invention to provide a vehicle-braking system employing improved manual operation in the presence of power runout or power failure.

It is an object of this invention to provide an improved power-braking system including a pressure ratio changer which operates during manual operation to minimize pedal effort.

It is an object of this invention to provide a pressure ratio changer that is selectively responsive to sources of force to change the pressure of the fluid being pressurized.

It is an object of this invention to provide a vehicle braking system employing power assist and having the additional safety feature of manual operation in the event of power failure.

Other objects and features of the invention will be apparent from the following description of the vehicle-braking system taken in connection with the accompanying drawings.

BRIEF DESCRIPTION OF THE DRAWINGS

FIG. 1 schematically illustrates a vehicle-braking system embodying the concept of this invention;

FIG. 2 is a sectional view taken along line 2—2 of FIG. 1;

FIG. 3 is an enlarged sectional view of the pressure ratio changer means of this invention, showing one mode of operation;

FIG. 4 is an enlarged sectional view of the pressure ratio changer means of this invention, showing another mode of operation;

DESCRIPTION OF THE PREFERRED EMBODIMENT

Figure 5:
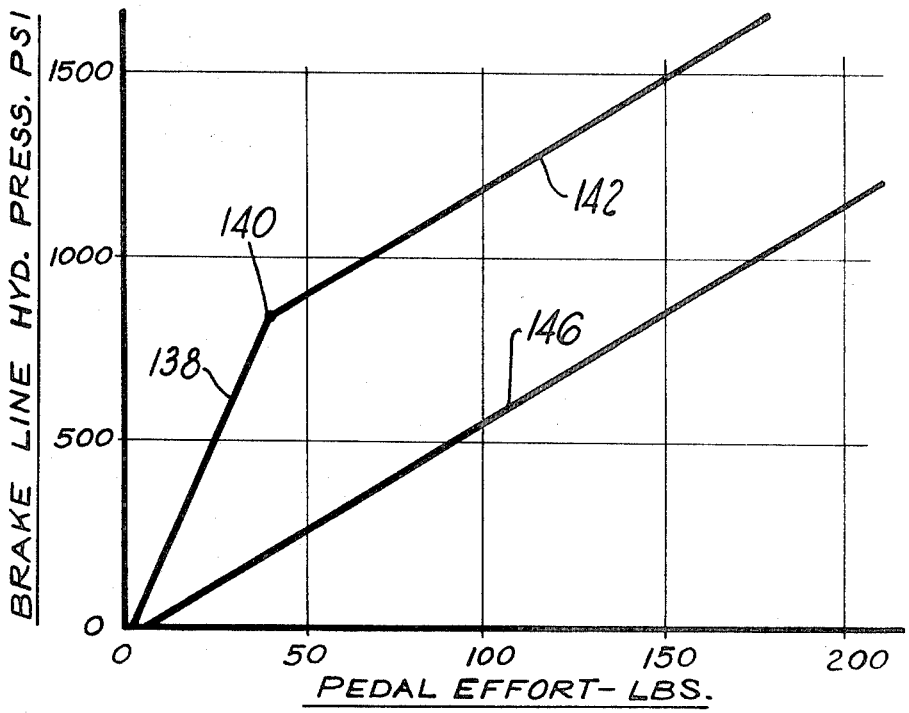
FIG. 5 is a graph showing brake line hydraulic pressure as a function of pedal effort by the vehicle operator.

With reference to FIG. 1, there is shown in schematic form a vehicle-braking system comprising a fluid pressure servomotor 10 which is responsive to an operator-operated means or brake pedal 12 to actuate a master cylinder 14 for pressurizing hydraulic fluid in conduits 16 and 17 so as to apply the front and rear brakes 18 and 20, respectively, of the vehicle.
:::
::: {.column}
More specifically, the fluid pressure servomotor 10 includes a forward shell 22 and a rearward shell 24 joined at 26 by a bayonet-type twist lock arrangement. A movable wall means 28 is operatively arranged within the shells of the servomotor 10 so as to define variable volume chambers 30 and 32. The movable wall means 28 includes a hub 34, a diaphragm means 36 and a diaphragm support means 38. The hub 34 is slidingly and sealingly carried by seal and support portion 40 of the rearward shell 24. The diaphragm means 36 has an outer bead 42 which is compressed between annular flanges 44 and 46 of the shells 22 and 24, respectively, to form a pressure seal therebetween. The diaphragm means 36 has an inner bead 48 which is installed around a center hole portion 50 of the diaphragm support plate 38. The diaphragm support plate 38 has fingers 52 which grip and fasten the support plate 38 to the hub 34 so as to create a seal between the diaphragm 38 and hub 34.

As may be seen in FIGS. 1 and 2, the hub 34 is further adapted to carry a pressure ratio changer means 54 comprising three concentric pistons 58, 60 and 62. The operator-operated means 12 includes a push rod 64 which engages the innermost piston 62 of the ratio changer means 54 to control a valve means, generally referred to as numeral 66, to establish the pressure differential across said movable wall means 28. More specifically, chamber 30 is in communication through a check valve 68 with the engine manifold vacuum, not shown. The movable wall means 28 is vacuum suspended in the brake released position, as shown in FIG. 1, since the valve means 66 allows communication of chamber 32 with chamber 30 via passages 31 and 33. The valve means 66 is responsive to actuation of said operator-operated means 12 to admit atmospheric air pressure into chamber 32 via passage 33 so as to move the movable wall means 28 to the left as viewed in FIG. 1. Return spring 70 is interposed between shell 22 and the hub 34 to return the movable wall means 28 to its inoperable position upon release of the braking application. Likewise, return spring 72 is interposed between flange 74 of valve means 66 and flange 76 of the push rod 64 to return said push rod to its inoperable position.

As may be seen best in FIG. 1, the master cylinder 14 is suitably installed in central opening 78 of the forward shell 22. The master cylinder 14 has a bore 80 which is slidably installed over the outer periphery of the piston 58 of the pressure ratio changer means. The bore 80 has an annular groove 82 equipped with a seal 84 to provide a fluid seal between the bore 80 and the piston 58. Similarly, the outer periphery of the master cylinder 14 has a groove 86 equipped with a seal 88 to provide a seal between the master cylinder 14 and forward shell 22. A flange 90 is provided on the master cylinder 14 to abut the shell 22 and thereby establish a predetermined axial relationship between the master cylinder 14 and the pressure ratio changer means 54.

Referring now specifically to the pressure ratio changer means 54, the outermost piston 58 slidably carries piston 60 and has an annular flange 92 against which piston 60 normally abuts. Piston 60 includes an annular groove 94 having a seal 96 installed therein to establish a fluid seal between pistons 58 and 60. The innermost piston 62 is slidably carried by piston 60 and has on one end a flange 98 and on the other end a groove 100 and snap ring 102 to establish predetermined axial movement between pistons 60 and 62. Piston 62 also includes an annular groove 104 having a seal 106 installed therein to establish a fluid seal between pistons 60 and 62. The innermost piston 62 includes a valve member 108 which projects into a hydraulic fluid chamber 110, the chamber 110 being defined by the end of the pressure ratio changer means 54, the bore 80 of the master cylinder 14 and a piston 112 slidably disposed in the bore 80. Referring briefly to FIG. 3, piston 112 has a valve seat 114 comprised of a resilient O-ring 116, an annular disc with chamfered seat 118, and a snap ring 120 cooperating with a groove 122 of the piston 112, to hold the valve seat in alignment to thereby facilitate its operation with the valve member 108. The chamber 110 is in communication through conduits 123, 124 and 125 with reservoir 126 of the master cylinder 14.
:::
::::

It is to be noted that the valve member 108 in cooperation with the valve seat 114 provides valve means which controls communication between the chamber 110 and the passages 123, 124 and 125 of the master cylinder. The piston 112 further has an annular groove 128 with seal 130 to insure a hydraulic fluid pressure seal between the hydraulic fluid chamber 110 and conduit 124 during periods when the valve member 108 is seated. The fluid chamber 110 is also provided with a conduit 132 threadably receiving a plug 134 to facilitate bleeding fluid from chamber 110 during installation or service of the device.

MODE OF OPERATION OF THE PREFERRED EMBODIMENT

Referring briefly to FIG. 1, it is noted that when the brake pedal 12 is in the released position, the movable wall means 28 is abutting the rearward shell 24 as at abutment 136 and the valve member 108 is withdrawn from the valve seat 114. Upon initial depression of brake pedal 12, valve member 108 moves to the left so as to seat against valve seat 114 thereby trapping hydraulic fluid within chamber 110.

Referring now to FIG. 3, if a brake application is desired, the driver of the vehicle will depress brake pedal 12 to move push rod 64 inwardly; whereby the valve means 66 will cut off the chamber 32 from the vacuum existing in chamber 30 to allow atmospheric air to flow through the hub 34 and passage 33 into control chamber 32. At this time, a pressure differential is created across the diaphragm 36 by means of atmospheric air being in chamber 32 and a vacuum being in chamber 30. The pressure differential will cause the movable wall means 28 to move to the left, as shown in FIG. 3. As the movable wall means 28 moves to the left, the hub 34 exerts a force on the outermost piston 58 to slide it toward the left within bore 80 of the master cylinder 14. Flange 92 of the piston 58 will abut piston 60 to cause it to travel to the left also. The previously described depression of the brake pedal 12 causes push rod 64 to move the innermost piston 62 to the left so that the pressure ratio changer means 54 as a whole moves to the left. The concentric pistons (essentially acting as a single piston) pressurize the trapped hydraulic fluid in chamber 110 which, in turn, transmits a force which moves piston 112 to the left to apply the vehicle brakes 18 and 20. Also the trapped hydraulic fluid in chamber 110 transmits a reactive force back to the operator through piston 62 and transmits force to the movable wall 28 through pistons 58 and 60; these forces being proportioned through the pistons so as to bring the system into equilibrium. The curves of FIG. 5 depict typical pedal effort characteristics of the fluid pressure servomotor 10. Specifically, brake line hydraulic pressure in p.s.i., is plotted along the ordinate as a function of pedal effort in pounds, plotted along the abscissa. The power assist operation of the structure described immediately above and shown in FIG. 3, is represented by curve 138, shown in FIG. 5. At the point of vacuum runout (identified in FIG. 5 at 140), the movable wall means 28, and thus the piston 58 will not move any further to the left in response to vacuum assist to further pressurize the hydraulic brake fluid. However, additional pedal effort may be applied by the vehicle operator through pedal 12 and push rod 64 to move pistons 62, 58 and 60 further to the left. At the point of vacuum runout, identified in FIG. 5 at 140, no additional force is developed by the movable wall means 28. Additional pedal effort may be applied by the vehicle operator through pedal 12 and push rod 64 to move piston 62 further to the left until contact is made by flange 98 and piston 60. As previously briefly mentioned, the increased pedal effort results in further movement to the left of pistons 62, 60 and 58, so that the reactive force of chamber 110 will be shared by the movable wall 28 and the pedal 12. The system is brought into equilibrium by the reactive force being proportioned between the movable wall 28 and the pedal 12. The increase in hydraulic fluid pressure possible through further leftward movement of the pressure ratio changer means 54 is represented by curve 142 as shown in FIG. 5.

Figure 6:
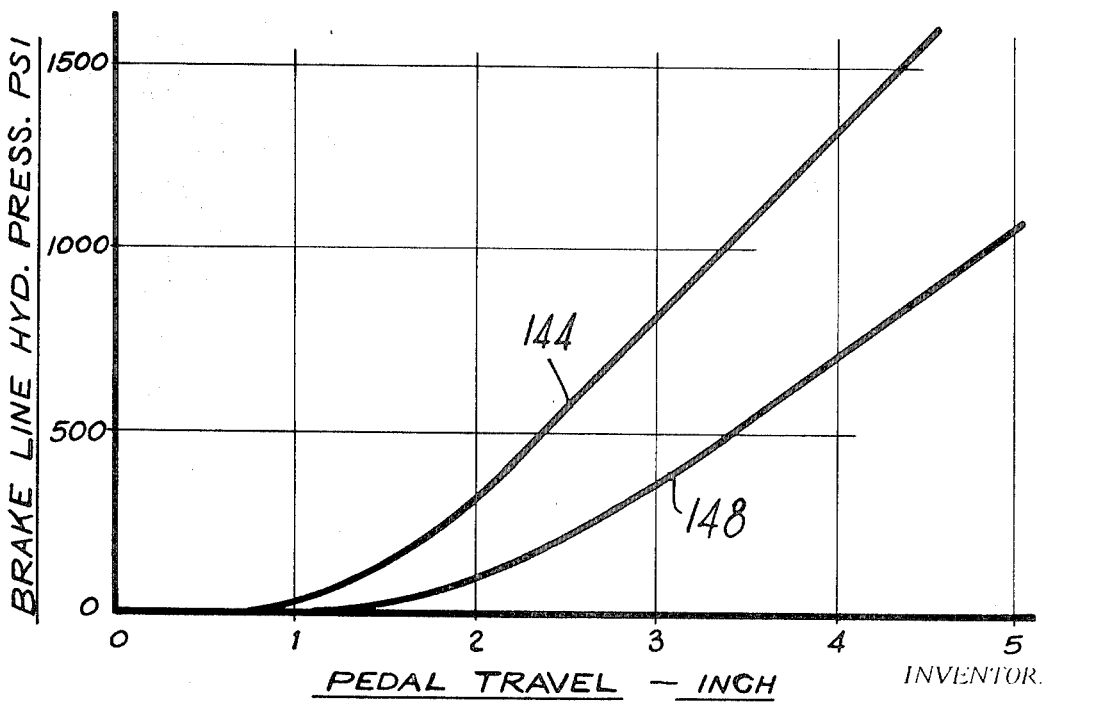
FIG. 6 is a graph showing brake line hydraulic pressure as a function of pedal travel by the vehicle operator.

The curves of FIG. 6 depict typical pedal travel characteristics of the fluid pressure servomotor 10. Specifically, brake line hydraulic pressure in p.s.i., is plotted along the ordinate as a function of pedal travel in inches, plotted along the abscissa. Curve 144 of FIG. 6 represents the pedal travel associated with vacuum power assist and further operation beyond vacuum runout.

It is noted that upon release of the braking application, return springs 70 and 72 return the movable wall 28 and brake pedal 12, respectively, to their brake released positions. Snap ring 102 will abut the end of piston 60 to return it to its brake released position.

Referring now specifically to FIG. 4, therein is shown the operation of the fluid pressure servomotor 10 and more importantly the manual operation of the pressure ratio changer means 54 in the event of a power assist failure. It is assumed that for one of several possible reasons that a pressure differential is not developed across the movable wall means 28 in response to a brake pedal 12 application. In the absence of the pressure differential, the hub 34 and outermost piston 58 remain stationary; i.e., do not move from their brake-released positions shown in FIG. 1. However, the push rod 64 applies a force on the innermost piston 62 to move it toward the left to apply the brakes as previously described. As piston 62 begins to move toward the left, flange 98 abuts piston 60 to cause it to move toward the left in unison with piston 62. As will be seen now by a comparison of FIGS. 3 and 4, a hydraulic pressure ratio change is made by having only two of the three concentric pistons move toward the left so as to pressurize the fluid in chamber 110. By using pistons 60 and 62 (instead of all three) the effective force transmitted to piston 112 is greater in the event of power failure. Thus, the pressure ratio change minimizes the conventional increase in pedal effort experienced in response to a power failure. Curve 146 of FIG. 5 shows the pedal effort required in the absence of vacuum power assist. Curve 148 of FIG. 6 depicts the pedal travel required in the absence of vacuum power assist.

While the specific details have been herein shown and described, the invention is not confined thereto, as other substitutions can be made within the spirit and scope of the invention.

I claim:

1. In a vehicle-braking system, a fluid pressure servomotor comprising:
    a housing;
    movable wall means operatively arranged in said housing defining variable volume chambers, said movable wall means including a hub;
    valve means carried in said hub;
    operator-operated means for actuating said valve means, said valve means operable to control a pressure differential across said movable wall means to cause said movable wall means to move in response to actuation of said operator-operated means;
    a hydraulic fluid chamber in communication with the brakes of said vehicle; and
    pressure ratio changer means having first, second and third concentric piston means operatively connected to said hydraulic chamber, said first piston means operatively connected to said movable wall means, said second piston means slidably carried by said first piston means and having its axial travel in one direction limited by said first piston means, said third piston means carried by said second piston means and including means to limit axial travel in both directions of said second piston means, said third piston means being operatively connected to said operator-operated means, said pressure ratio changer means being selectively responsive to said movable wall means and said operator-operated means to pressurize said hydraulic fluid chamber and apply said brakes.

2. A pressure ratio changer device comprising:
    a fluid chamber having fluid therein;
    a first source of force;
    a second source of force; and piston means having first, second and third concentric pistons operatively connected to said fluid chamber, said first piston being operatively connected by said first source of force, said second piston being carried by said first piston and having its axial travel in one direction limited by said first piston, and said third piston being carried by said second piston and including means to limit axial travel in both directions of said second piston, said third piston being operatively connected to said second source of force.

3. In a vehicle-braking system, a fluid pressure servomotor, comprising:

a housing;

movable wall means dividing said housing into a first variable volume chamber and a second variable volume chamber, said movable wall means being carried by a hub member containing valve means controlled by an operator-actuating means, said valve means being operable to control a pressure differential across said movable wall means in response to said operator-actuating means;

a hydraulic fluid chamber in communication with the brakes of said vehicle;

first piston means having one end connected to said movable wall means and the other end slidably retained in said hydraulic fluid chamber;

second piston means retained in a bore of said first piston means by a flange, said second piston means moving with said first piston means in said hydraulic fluid chamber; and third piston means retained in a bore of said second piston means having limiting means to restrict the movement of said third piston means in said second piston means, said third piston means being operatively connected to said operator actuating means to provide an operator with a feel of a reactive force upon pressurization of said hydraulic chamber.

4. In the vehicle-braking system, as recited in claim 3 including:

master cylinder piston means located in said hydraulic chamber to form a fluid reaction transfer chamber between said piston means and said third piston means and said third piston means, said master cylinder means having a passageway communicating hydraulic fluid to said reaction chamber, said third piston means closing said passageway upon movement in response to said operator-actuating means in order that the fluid in said reaction transfer chamber will proportion said reactive force to said first piston means and said second piston means.

5. In the vehicle-braking system, as recited in claim 4 wherein said reaction transfer chamber communicates with a hydraulic fluid reservoir of a master cylinder by valve means, said valve means being controlled by a projection on said third piston means to regulate said closing of said passageway.

6. In the vehicle-braking system, as recited in claim 5 wherein said first piston means is retained in said movable wall in axial alignment with said hydraulic fluid chamber to permit any manual activating force to be directly applied through said third piston means to said master cylinder piston means.

7. A pressure ratio changer device, comprising:

a fluid chamber having fluid therein;

a first source of force;

a second source of force;

a first piston operatively connected to said first source of force;

a second piston concentrically carried by said first piston having its axial travel in one direction limited by said first piston;

a third piston concentrically carried by said second piston having limiting means to restrict axial travel of said third piston in both directions within said second piston, said third piston being operatively connected to said second source of force; and means responding to said first force and said second force for pressurizing said fluid in said fluid chamber.

8. The pressure ratio changer device, as recited in claim 7, wherein said responding means includes:

piston means located in said fluid chamber having a passageway communicating said fluid to a reactive chamber adjacent said third piston, said third piston closing said passageway upon movement in response to said second source of force whereby said fluid in said chamber will proportion a reactive force from said piston means to said first piston and said second piston.

9. The pressure ratio changer device, as recited in claim 8 wherein said third piston will transmit to an operator said reactive force to provide feel upon pressurization of said fluid chamber.

10. The pressure ratio changer device, as recited in claim 8 wherein said third piston includes:

a projection which seats on said piston means in closing said passageway.